(12) United States Patent
Prahlad et al.

(10) Patent No.: US 8,234,249 B2
(45) Date of Patent: *Jul. 31, 2012

(54) METHOD AND SYSTEM FOR SEARCHING STORED DATA

(75) Inventors: Anand Prahlad, East Brunswick, NJ (US); Srinivas Kavuri, Hyderabad (IN); Rajiv Kottomtharayil, Marlboro, NJ (US); Arun Prasad Amarendran, Eatontown, NJ (US); Brian Brockway, Shrewsbury, NJ (US); Marcus S. Muller, Tinton Falls, NJ (US); Andreas May, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/076,634

(22) Filed: Mar. 31, 2011

(65) Prior Publication Data

US 2011/0179039 A1    Jul. 21, 2011

Related U.S. Application Data

(63) Continuation of application No. 12/058,589, filed on Mar. 28, 2008, now Pat. No. 7,937,365, which is a continuation of application No. 11/931,034, filed on Oct. 31, 2007, now abandoned.

(60) Provisional application No. 60/871,735, filed on Dec. 22, 2006.

(51) Int. Cl.
*G06F 17/30* (2006.01)

(52) U.S. Cl. ..................................... 707/640

(58) Field of Classification Search .................. 707/640; 709/223

See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |

(Continued)

FOREIGN PATENT DOCUMENTS

EP        0259912 A1    3/1988

(Continued)

OTHER PUBLICATIONS

U.S. Appl. No. 12/978,050, filed Dec. 23, 2010, Pawar.

(Continued)

*Primary Examiner* — Etienne Leroux

(74) *Attorney, Agent, or Firm* — Perkins Coie LLP

(57) ABSTRACT

A complete document management system is disclosed. Accordingly, systems and methods for managing data associated with a data storage component coupled to multiple computers over a network are disclosed. Systems and methods for managing data associated with a data storage component coupled to multiple computers over a network are further disclosed. Additionally, systems and methods for accessing documents available through a network, wherein the documents are stored on one or more data storage devices coupled to the network, are disclosed.

21 Claims, 11 Drawing Sheets

U.S. PATENT DOCUMENTS

| | | |
|---|---|---|
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,519,865 A | 5/1996 | Kondo et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,737,747 A | 4/1998 | Vishlitzky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,832,510 A | 11/1998 | Ito et al. |
| 5,875,478 A | 2/1999 | Blumenau |
| 5,887,134 A | 3/1999 | Ebrahim |
| 5,892,917 A | 4/1999 | Myerson |
| 5,901,327 A | 5/1999 | Ofek |
| 5,907,621 A | 5/1999 | Bachman et al. |
| 5,924,102 A | 7/1999 | Perks |
| 5,950,205 A | 9/1999 | Aviani, Jr. |
| 5,953,721 A | 9/1999 | Doi et al. |
| 5,974,563 A | 10/1999 | Beeler, Jr. |
| 6,006,225 A | 12/1999 | Bowman et al. |
| 6,021,415 A | 2/2000 | Cannon et al. |
| 6,023,710 A | 2/2000 | Steiner et al. |
| 6,026,414 A | 2/2000 | Anglin |
| 6,052,735 A | 4/2000 | Ulrich et al. |
| 6,061,692 A | 5/2000 | Thomas et al. |
| 6,076,148 A | 6/2000 | Kedem |
| 6,088,697 A | 7/2000 | Crockett et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,374,336 B1 | 4/2002 | Peters et al. |
| 6,389,432 B1 | 5/2002 | Pothapragada et al. |
| 6,418,478 B1 | 7/2002 | Ignatius et al. |
| 6,421,683 B1 | 7/2002 | Lamburt |
| 6,421,711 B1 | 7/2002 | Blumenau et al. |
| 6,421,779 B1 | 7/2002 | Kuroda et al. |
| 6,430,575 B1 | 8/2002 | Dourish et al. |
| 6,438,586 B1 | 8/2002 | Hass et al. |
| 6,487,561 B1 | 11/2002 | Ofek et al. |
| 6,487,644 B1 | 11/2002 | Huebsch et al. |
| 6,507,852 B1 | 1/2003 | Dempsey et al. |
| 6,516,314 B1 | 2/2003 | Birkler et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,581,143 B2 | 6/2003 | Gagne et al. |
| 6,625,623 B1 | 9/2003 | Midgley et al. |
| 6,647,396 B2 | 11/2003 | Parnell et al. |
| 6,658,436 B2 | 12/2003 | Oshinsky et al. |
| 6,658,526 B2 | 12/2003 | Nguyen et al. |
| 6,732,124 B1 | 5/2004 | Koseki et al. |
| 6,763,351 B1 | 7/2004 | Subramaniam et al. |
| 6,772,164 B2 | 8/2004 | Reinhardt |
| 6,775,790 B2 | 8/2004 | Reuter et al. |
| 6,836,779 B2 | 12/2004 | Poulin |
| 6,847,984 B1 | 1/2005 | Midgley et al. |
| 6,857,053 B2 | 2/2005 | Smith et al. |
| 6,871,163 B2 | 3/2005 | Hiller et al. |
| 6,886,020 B1 | 4/2005 | Zahavi et al. |
| 6,947,935 B1 | 9/2005 | Horvitz et al. |
| 6,983,322 B1 | 1/2006 | Tripp et al. |
| 6,996,616 B1 | 2/2006 | Leighton et al. |
| 7,003,519 B1 | 2/2006 | Biettron et al. |
| 7,035,880 B1 | 4/2006 | Crescenti et al. |
| 7,047,236 B2 | 5/2006 | Conroy et al. |
| 7,085,787 B2 | 8/2006 | Beier et al. |
| 7,103,740 B1 | 9/2006 | Colgrove et al. |
| 7,130,860 B2 | 10/2006 | Pachet et al. |
| 7,130,970 B2 | 10/2006 | Devassy et al. |
| 7,149,750 B2 | 12/2006 | Chadwick |
| 7,165,082 B1 | 1/2007 | DeVos |
| 7,167,895 B1 | 1/2007 | Connelly |
| 7,181,444 B2 | 2/2007 | Porter et al. |
| 7,194,454 B2 | 3/2007 | Hansen et al. |
| 7,197,502 B2 | 3/2007 | Feinsmith |
| 7,200,726 B1 | 4/2007 | Gole et al. |
| 7,240,100 B1 | 7/2007 | Wein et al. |
| 7,246,207 B2 | 7/2007 | Kottomtharayil et al. |
| 7,246,211 B1 | 7/2007 | Beloussov et al. |
| 7,269,612 B2 | 9/2007 | Devarakonda et al. |
| 7,272,606 B2 | 9/2007 | Borthakur et al. |
| 7,330,997 B1 | 2/2008 | Odom |
| 7,343,365 B2 | 3/2008 | Farnham et al. |
| 7,346,623 B2 | 3/2008 | Prahlad et al. |
| 7,346,676 B1 | 3/2008 | Swildens et al. |
| 7,356,657 B2 | 4/2008 | Mikami |
| 7,356,660 B2 | 4/2008 | Matsunami et al. |
| 7,359,917 B2 | 4/2008 | Winter et al. |
| 7,386,663 B2 | 6/2008 | Cousins |
| 7,395,282 B1 | 7/2008 | Crescenti et al. |
| 7,430,587 B2 | 9/2008 | Malone et al. |
| 7,433,301 B2 | 10/2008 | Akahane et al. |
| 7,440,966 B2 | 10/2008 | Adkins et al. |
| 7,440,984 B2 | 10/2008 | Augenstein et al. |
| 7,454,569 B2 | 11/2008 | Kavuri et al. |
| 7,496,589 B1 | 2/2009 | Jain et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,512,814 B2 | 3/2009 | Chen et al. |
| 7,529,748 B2 | 5/2009 | Wen et al. |
| 7,532,340 B2 | 5/2009 | Koppich et al. |
| 7,533,103 B2 | 5/2009 | Brendle et al. |
| 7,533,181 B2 | 5/2009 | Dawson et al. |
| 7,583,861 B2 | 9/2009 | Hanna et al. |
| 7,584,227 B2 | 9/2009 | Gokhale et al. |
| 7,590,997 B2 | 9/2009 | Diaz Perez |
| 7,613,728 B2 | 11/2009 | Png et al. |
| 7,613,752 B2 | 11/2009 | Prahlad et al. |
| 7,617,541 B2 | 11/2009 | Plotkin et al. |
| 7,620,710 B2 | 11/2009 | Kottomtharayil et al. |
| 7,624,443 B2 | 11/2009 | Kramer et al. |
| 7,627,598 B1 | 12/2009 | Burke |
| 7,627,617 B2 | 12/2009 | Kavuri et al. |
| 7,631,151 B2 | 12/2009 | Prahlad et al. |
| 7,634,478 B2 | 12/2009 | Yang et al. |

| | | |
|---|---|---|
| 7,657,550 B2 | 2/2010 | Prahlad et al. |
| 7,660,800 B2 | 2/2010 | Prahlad et al. |
| 7,660,807 B2 | 2/2010 | Prahlad et al. |
| 7,668,798 B2 | 2/2010 | Scanlon et al. |
| 7,668,884 B2 | 2/2010 | Prahlad et al. |
| 7,672,962 B2 | 3/2010 | Arrouye et al. |
| 7,693,856 B2 | 4/2010 | Arrouye et al. |
| 7,707,178 B2 | 4/2010 | Prahlad et al. |
| 7,711,700 B2 | 5/2010 | Prahlad et al. |
| 7,716,171 B2 | 5/2010 | Kryger |
| 7,716,191 B2 | 5/2010 | Blumenau et al. |
| 7,720,801 B2 | 5/2010 | Chen |
| 7,725,605 B2 | 5/2010 | Palmeri et al. |
| 7,725,671 B2 | 5/2010 | Prahlad et al. |
| 7,734,593 B2 | 6/2010 | Prahlad et al. |
| 7,734,669 B2 | 6/2010 | Kottomtharayil et al. |
| 7,734,715 B2 | 6/2010 | Hyakutake et al. |
| 7,747,579 B2 | 6/2010 | Prahlad et al. |
| 7,756,837 B2 | 7/2010 | Williams et al. |
| 7,801,864 B2 | 9/2010 | Prahlad et al. |
| 7,818,215 B2 | 10/2010 | King et al. |
| 7,822,749 B2 | 10/2010 | Prahlad et al. |
| 7,831,553 B2 | 11/2010 | Prahlad et al. |
| 7,831,622 B2 | 11/2010 | Prahlad et al. |
| 7,831,795 B2 | 11/2010 | Prahlad et al. |
| 7,840,537 B2 | 11/2010 | Gokhale et al. |
| 7,840,619 B2 | 11/2010 | Horn |
| 7,849,059 B2 | 12/2010 | Prahlad et al. |
| 7,890,467 B2 | 2/2011 | Watanabe et al. |
| 7,890,469 B1 | 2/2011 | Maionchi et al. |
| 7,925,856 B1 | 4/2011 | Greene |
| 7,933,920 B2 | 4/2011 | Kojima et al. |
| 7,937,365 B2 * | 5/2011 | Prahlad et al. ............ 707/640 |
| 7,962,709 B2 | 6/2011 | Agrawal |
| 7,966,495 B2 | 6/2011 | Ackerman et al. |
| 2001/0047365 A1 | 11/2001 | Yonaitis |
| 2002/0049626 A1 | 4/2002 | Mathias et al. |
| 2002/0069324 A1 | 6/2002 | Gerasimov et al. |
| 2002/0087550 A1 | 7/2002 | Carlyle et al. |
| 2002/0161753 A1 | 10/2002 | Inaba et al. |
| 2003/0018607 A1 | 1/2003 | Lennon et al. |
| 2003/0046313 A1 | 3/2003 | Leung et al. |
| 2003/0130993 A1 | 7/2003 | Mendelevitch et al. |
| 2003/0182583 A1 | 9/2003 | Turco |
| 2004/0015514 A1 | 1/2004 | Melton et al. |
| 2004/0254919 A1 | 12/2004 | Giuseppini |
| 2004/0260678 A1 | 12/2004 | Verbowski et al. |
| 2005/0010588 A1 | 1/2005 | Zalewski et al. |
| 2005/0050075 A1 | 3/2005 | Okamoto et al. |
| 2005/0055352 A1 | 3/2005 | White et al. |
| 2005/0055386 A1 | 3/2005 | Tosey |
| 2005/0154695 A1 | 7/2005 | Gonzalez et al. |
| 2005/0187937 A1 | 8/2005 | Kawabe et al. |
| 2005/0188248 A1 | 8/2005 | O'Brien et al. |
| 2005/0216453 A1 | 9/2005 | Sasaki et al. |
| 2005/0228794 A1 | 10/2005 | Navas et al. |
| 2005/0262097 A1 | 11/2005 | Sim-Tang et al. |
| 2006/0004820 A1 | 1/2006 | Claudatos et al. |
| 2006/0010227 A1 | 1/2006 | Atluri |
| 2006/0224846 A1 | 10/2006 | Amarendran et al. |
| 2006/0230082 A1 | 10/2006 | Jasrasaria |
| 2006/0259468 A1 | 11/2006 | Brooks et al. |
| 2006/0259527 A1 | 11/2006 | Devarakonda et al. |
| 2007/0033191 A1 | 2/2007 | Hornkvist et al. |
| 2007/0043956 A1 | 2/2007 | El Far et al. |
| 2007/0100867 A1 | 5/2007 | Celik et al. |
| 2007/0185915 A1 | 8/2007 | Prahlad et al. |
| 2007/0185926 A1 | 8/2007 | Prahlad et al. |
| 2007/0192385 A1 | 8/2007 | Prahlad et al. |
| 2007/0203938 A1 | 8/2007 | Prahlad et al. |
| 2007/0288536 A1 | 12/2007 | Sen et al. |
| 2008/0059515 A1 | 3/2008 | Fulton |
| 2008/0077594 A1 | 3/2008 | Ota |
| 2008/0091655 A1 | 4/2008 | Gokhale et al. |
| 2008/0091747 A1 | 4/2008 | Prahlad et al. |
| 2008/0183662 A1 | 7/2008 | Reed et al. |
| 2008/0228771 A1 | 9/2008 | Prahlad et al. |
| 2008/0229037 A1 | 9/2008 | Bunte et al. |
| 2008/0243796 A1 | 10/2008 | Prahlad et al. |
| 2008/0249996 A1 | 10/2008 | Prahlad et al. |
| 2008/0294605 A1 | 11/2008 | Prahlad et al. |
| 2009/0287665 A1 | 11/2009 | Prahlad et al. |
| 2009/0319534 A1 | 12/2009 | Gokhale |
| 2009/0319585 A1 | 12/2009 | Gokhale |
| 2010/0057870 A1 | 3/2010 | Ahn et al. |
| 2010/0082672 A1 | 4/2010 | Kottomtharayil et al. |
| 2010/0114952 A1 | 5/2010 | Scanlon et al. |
| 2010/0131461 A1 | 5/2010 | Prahlad et al. |
| 2010/0179941 A1 | 7/2010 | Agrawal et al. |
| 2010/0205150 A1 | 8/2010 | Prahlad et al. |
| 2010/0250549 A1 | 9/2010 | Muller et al. |
| 2010/0299490 A1 | 11/2010 | Attarde et al. |
| 2011/0047180 A1 | 2/2011 | Prahlad et al. |
| 2011/0093470 A1 | 4/2011 | Gokhale et al. |
| 2011/0276664 A1 | 11/2011 | Prahlad et al. |

FOREIGN PATENT DOCUMENTS

| | | |
|---|---|---|
| EP | 0405926 A2 | 1/1991 |
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| EP | 1174795 | 1/2002 |
| WO | WO-9513580 A1 | 5/1995 |
| WO | WO-9912098 A1 | 3/1999 |
| WO | WO-9914692 A1 | 3/1999 |
| WO | WO-0106368 A1 | 1/2001 |
| WO | WO-03060774 A1 | 7/2003 |
| WO | WO-2005055093 A2 | 6/2005 |
| WO | WO-2007062254 A2 | 5/2007 |
| WO | WO-2007062429 A2 | 5/2007 |
| WO | WO-2008049023 A2 | 4/2008 |

OTHER PUBLICATIONS

U.S. Appl. No. 13/076,714, filed Mar. 31, 2011, Varadharajan et al.
U.S. Appl. No. 13/077,516, filed Mar. 31, 2011, Prahlad et al.
"Text Figures", retrieved from http://www.microsoft.com/msj/1198.ntfs/ntfstextfigs.htm on Nov. 10, 2005, 7 pages.
Armstead et al., "Implementation of a Campus-wide Distributed Mass Storage Service: The Dream vs. Reality," *IEEE*, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.
Bowman et al. "Harvest: A Scalable, Customizable Discovery and Access System," Department of Computer Science, University of Colorado—Boulder, Revised Mar. 1995, 29 pages.
Brad O'Neill, "New Tools to Classify Data," Storage Magazine, Aug. 2005, 4 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Communication with extended European Search Report for Application No. PCT/US2006/061304, dated Dec. 30, 2008.
Eitel, "Backup and Storage Management in Distributed Heterogeneous Environments," *IEEE*, 1994, pp. 124-126.
EMC Corporation, "Today's Choices for Business Continuity," 2004, 12 pages.
European Patent Office Examination Report for EP application 06846386.8, Mail Date Apr. 29, 2009, 6 pages.
Farley, M., "Storage Network Fundamentals,, Network Backup: The Foundation of Storage Management, Data Management," Storage Networking Fundamentals: an Introduction to Storage Devices, Subsystems, Applications, Management, and Filing [File] Systems, Cisco Press, Jan. 1, 2005, 9 pages.
Jander, M., "Launching Storage-Area Net," *Data Communications*, US, McGraw Hill, NY, vol. 27, No. 4 (Mar. 21, 1998), pp. 64-72.

Jeffrey Cooperstein and Jeffrey Richter, "Keeping an Eye on Your NTFS Drives, Part II: Building a Change Journal Application," Microsoft Systems Journal, Oct. 1999, 14 pages.

Jeffrey Cooperstein and Jeffrey Richter, "Keeping an Eye on Your NTFS Drives: the Windows 2000 Change Journal Explained," Microsoft Systems Journal, Sep. 1999, 17 pages.

Jeffrey Richter and Luis Felipe Cabrera, "A File System for the 21st Century: Previewing the Windows NT 5.0 File System," and attached text figures, Microsoft Systems Journal, Nov. 1998, 24 pages.

Karl Langdon and John Merryman, "Data Classification: Getting Started," Storage Magazine, Jul. 2005, 3 pages.

Manber et al., "WebGlimpse—Combining Browsing and Searching," 1997 Usenix Technical Conference, Jan. 1997, 12 pages.

Microsoft Developer Network, "GetFileAttributes," online library article, [accessed on Nov. 10, 2005], 3 pages.

Microsoft Developer Network, "GetFileAttributesEx," online library article, [accessed on Nov. 10, 2005], 2 pages.

Microsoft Developer Network, "Win32_File_Attribute_Data," online library article, [accessed on Nov. 10, 2005], 3 pages.

Partial International Search Results, mailed May 25, 2007, International Application No. PCT/US2006/045556, 2 pages.

Rosenblum et al., "The Design and Implementation of a Log-Structured File System," *Operating Systems Review SIGOPS*, vol. 25, No. 5, New York, US, pp. 1-15 (May 1991).

Supplementary European Search Report for European Application EP06846386, Dated Dec. 30, 2008, European Patent Office, 6 pages.

\* cited by examiner

METHOD AND SYSTEM FOR SEARCHING STORED DATA

CROSS-REFERENCE TO RELATED APPLICATION

This application is a continuation application of U.S. application Ser. No. 12/058,589, filed Mar. 28, 2008 now U.S. Pat. No. 7,937,365, which is a continuation application of U.S. application Ser. No. 11/931,034, filed Oct. 31, 2007 now abandoned, which claims priority to U.S. Provisional Application No. 60/871,735, filed Dec. 22, 2006, each of which is herein incorporated by reference in its entirety.

BACKGROUND

Data protection systems contain large amounts of data. This data includes personal data, such as financial data, customer/client/patient contact data, audio/visual data, and much more. Corporate computer systems often contain word processing documents, engineering diagrams, spreadsheets, business strategy presentations, and so on. With the proliferation of computer systems and the ease of creating content, the amount of content in an organization has expanded rapidly. Even small offices often have more information stored than any single employee can know about or locate.

Some data protection applications provide functions for actively searching for files within the organization based on a previously created index of the information available in each file. A user can then search for and retrieve documents based on a topic. Typical search software operates on a single index of keywords derived from the data that has been copied for protection purposes. It is typical for an organization to maintain many secondary copies of its data and the various copies are typically stored in multiple formats in multiple devices. For example, when current copy of data is made, previous copies are often maintained so that an historical archive is created. Thus, if the most recent copy does not have the desired data for a restore operation, an older copy may be used. With the existence of multiple copies on multiple devices spanning weeks, months and even years, a search over this data can be complex and time consuming. A search over such a large amount of data can require separately searching content indices of all of the computer systems within an organization. This can put an unexpected load on already burdened systems and can require significant time on the part of a system operator.

Typical search systems also create problems when retrieval of the desired data is attempted. First, typical systems require that retrieval of the identified data be performed as a restore operation. The typical restore operation first identifies a secondary copy of the data in question on a secondary volume and copies the identified copy of the data back onto a production server (or other primary or working volume) and overwrites the existing data files. This can be inconvenient if it is desired to maintain the production copy or if it is merely desired to inspect the contents of a secondary data store. Second, typical systems are blind to the security rights of users and database operators. Typical systems do not have an integrated data rights security control that identifies the security privileges of the operator or user for whom the data is being restored and allows or denies the restore accordingly. Additionally, typical systems do not allow a user to promote and reapply search criteria throughout the data management system.

BRIEF DESCRIPTION OF THE DRAWINGS

In the drawings, the same reference numbers and acronyms identify elements or acts with the same or similar functionality for ease of understanding and convenience.

DETAILED DESCRIPTION

The invention will now be described with respect to various examples. The following description provides specific details for a thorough understanding of, and enabling description for, these examples of the invention. However, one skilled in the art will understand that the invention may be practiced without these details. In other instances, well-known structures and functions have not been shown or described in detail to avoid unnecessarily obscuring the description of the examples of the invention.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Figure 1:
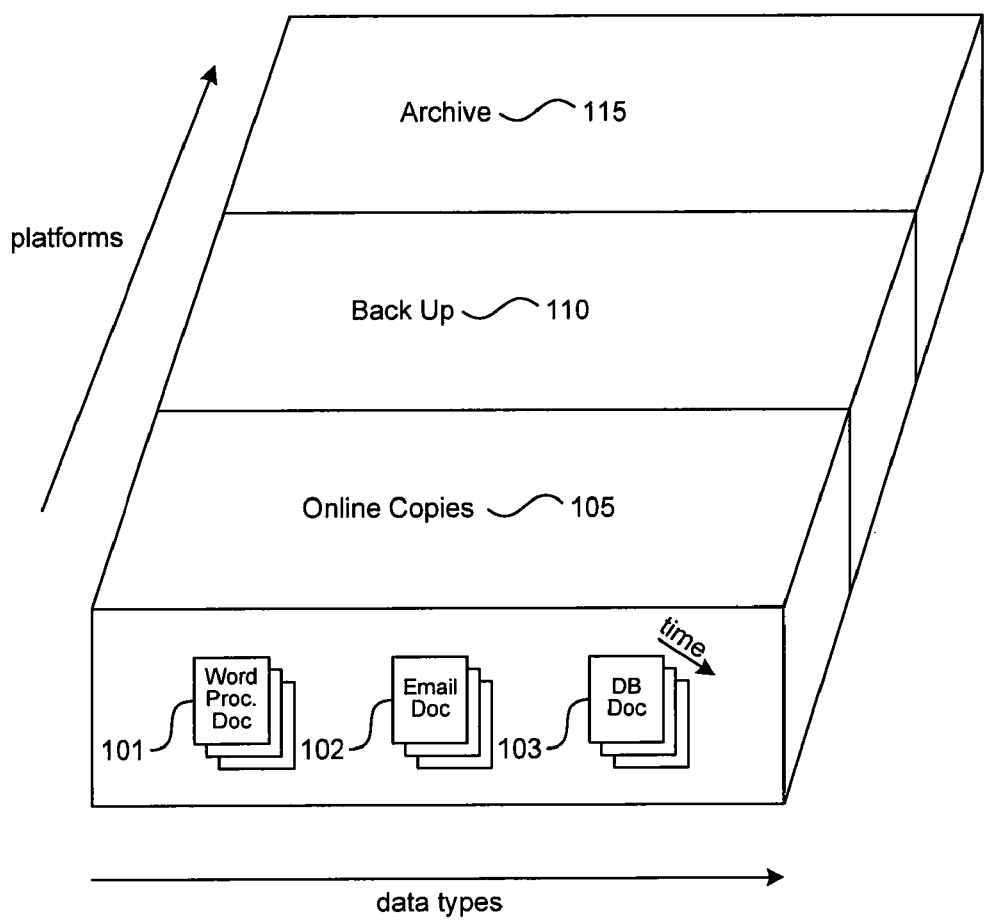
FIG. 1 illustrates an example of a group of platforms and data types for searching.

FIG. 1 illustrates a summary example of a group of platforms and data types that can be searched. As illustrated and as described in more detail herein, a search can be performed over any platform, over any data type, and for documents having been created over any period of time. As illustrated, the system described herein can operate to archive and search data files including, for example, word processing documents 101, email correspondence 102, and database files 103. These files and documents can exist as online copies 105, backup copies 110, and archive copies 115. Thus, the systems and methods described herein can be used to search for and locate virtually any document that has ever existed on an institutional system, whether it currently exists or existed at any time in the past. These various data types and platform types can coexist in and be operated on in a hierarchical data storage system.

Suitable System

Figure 2:
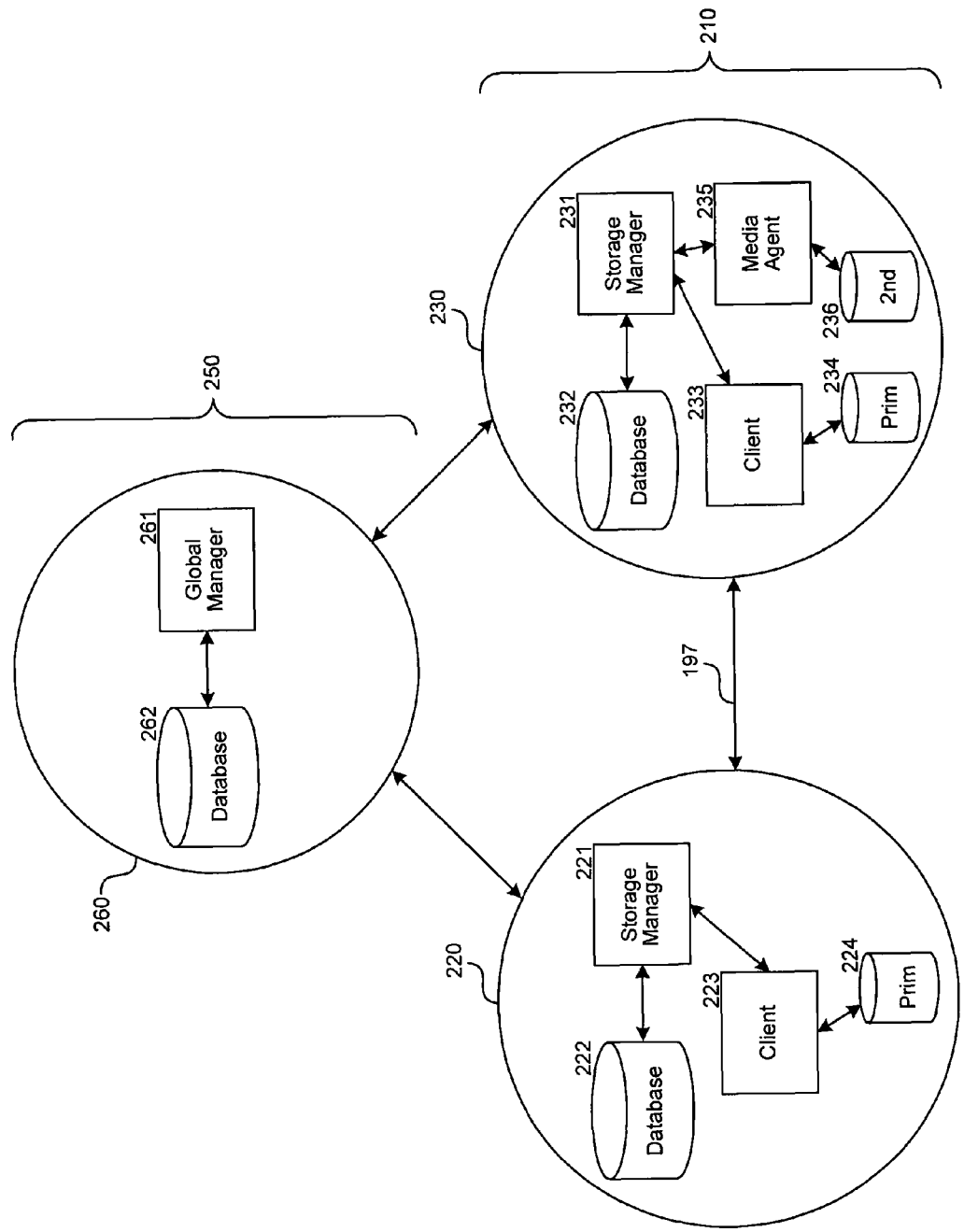
FIG. 2 is a block diagram that illustrates a hierarchical data storage system.

Referring to FIG. 2, a block diagram illustrating a hierarchical data storage system comprises two levels: a storage operations level 210 and a global level 250. The global level 250 may contain a global operations cell 260, which may contain a global manager 261 and a database 262. The storage operations level 210 may contain storage operations cells, such as cells 220 and 230. Cells 220 and 230 may perform specified data storage operations, or may perform varied data storage operations that depend on the needs of the system.

Cell 220 contains components used in data storage operations, such as a storage manager 221, a database 222, a client 223, and a primary storage database 224. Cell 230 may contain similar components, such as storage manager 231, a database 232, a client 233, and a primary storage database 234. In this example, cell 230 also contains media agent 235 and secondary database 236. Both cells 220 and 230 communicate with global manager 260, providing information related to the data storage operations of their respective cells.

Figure 3:
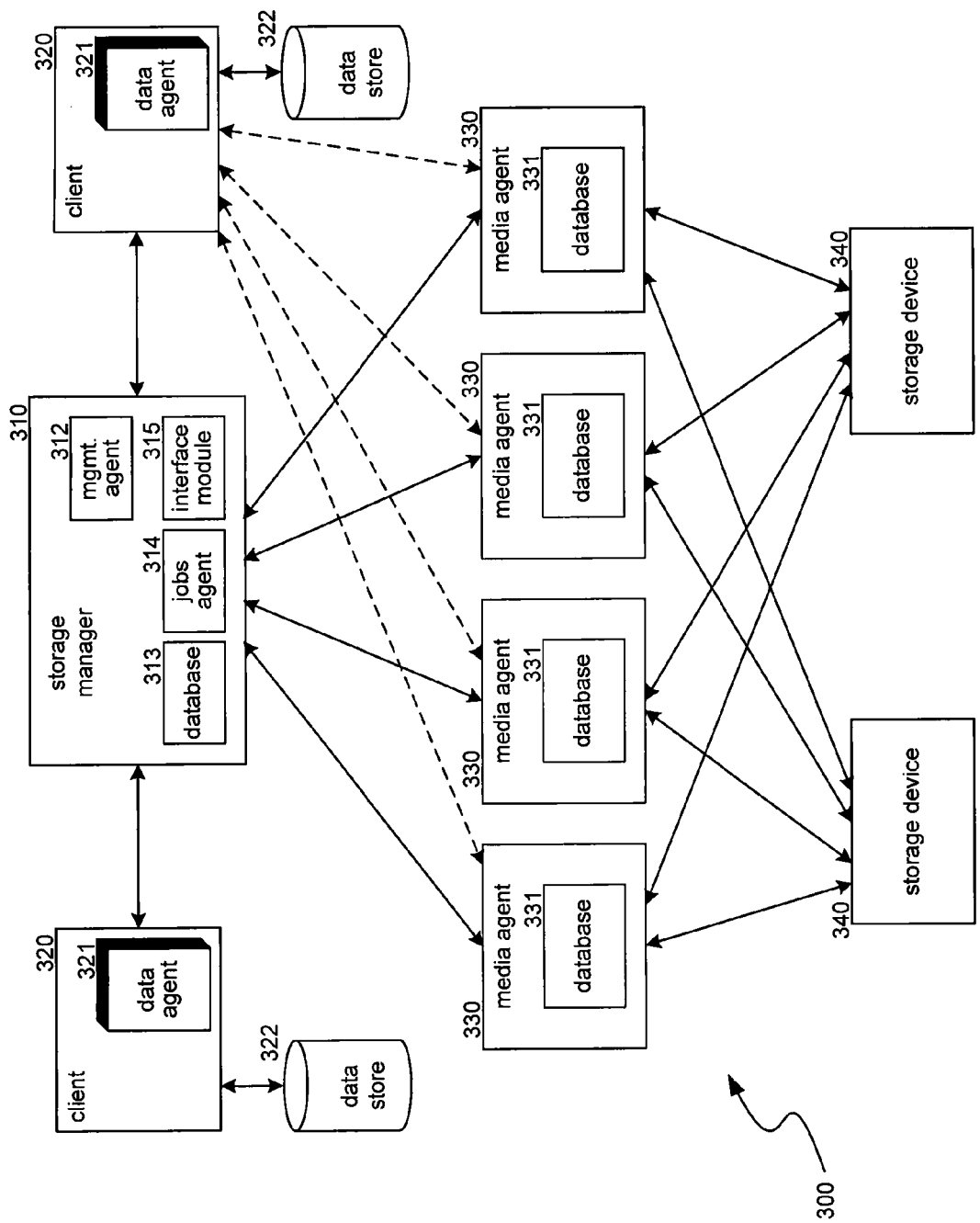
FIG. 3 is a block diagram that illustrates components of a storage operations cell.

Referring to FIG. 3, a block diagram illustrating components of a storage operations cell is shown. Storage operations cells (such as cells 220 or 230 of FIG. 2) may contain some or all of the following components, depending on the use of the cell and the needs of the system. For example, cell 300 contains a storage manager 310, clients 320, multiple media agents 330, and multiple storage devices 340. Storage manager 310 controls media agents 330, which are responsible, at least in part, for transferring data to storage devices 340. Storage manager 310 includes a jobs agent 311, a management agent 312, a database 313, and an interface module 314. Storage manager 310 communicates with client 320. Client 320 accesses data to be stored by the system from database 322 via a data agent 321. The system uses media agents 330, which contain databases 331, to transfer and store data into storage devices 340.

Cells 300 may include software and/or hardware components and modules used in data storage operations. The cells 300 may be transfer cells that function to transfer data during data store operations. The cells 300 may perform other storage operations in addition to operations used in data transfers. For example, cells 300 may perform creating, storing, retrieving, and/or migrating primary and secondary data copies. The data copies may include snapshot copies, secondary copies, hierarchical storage manager copies, archive copies, and so on. The cells 300 may also perform storage management functions that may push information to higher level cells, including global manager cells.

In some embodiments, the system can be configured to perform a storage operation based on one or more storage policies. A storage policy may be, for example, a data structure that includes a set of preferences or other criteria considered during storage operations. The storage policy may determine or define a storage location, a relationship between components, network pathways, accessible datapipes, retention schemes, compression or encryption requirements, preferred components, preferred storage devices or media, and so on. Storage policies may be stored in storage manager 310, 221, 231, or may be stored in global manager 261, as discussed above.

Additionally or alternatively, the system may implement or utilize schedule policies. A schedule policy may specify when to perform storage operations, how often to perform storage operations, and so on. The schedule policy may also define the use of sub-clients, where one type of data (such as email data) is stored using one sub-client, and another type of data (such as database data) is stored using another sub-client. In these cases, storage operations related to specific data types (email, database, and so on) may be distributed between cells.

Figure 4:
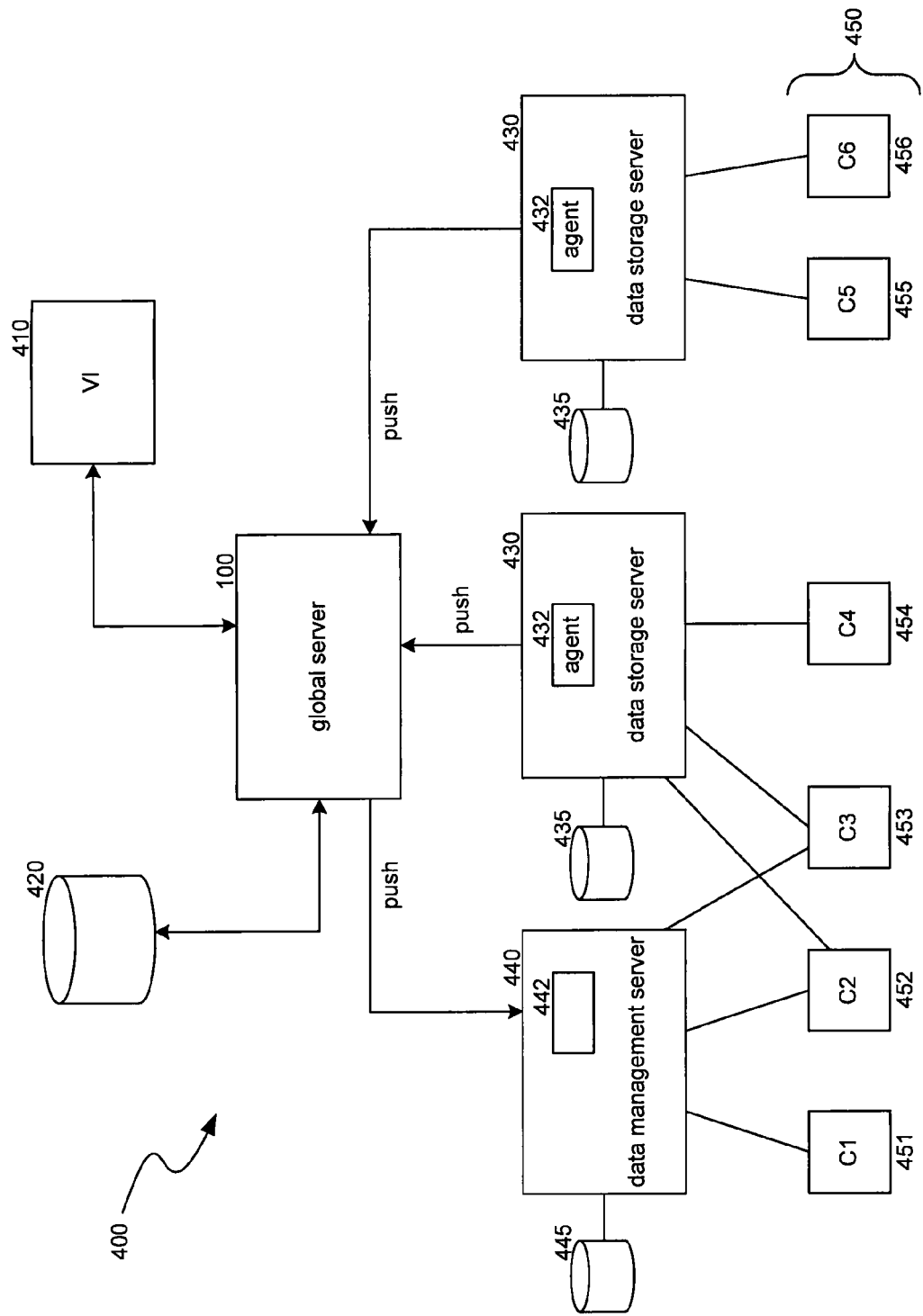
FIG. 4 is a block diagram that illustrates interaction between a global cell and data storage cells.

Referring to FIG. 4, a block diagram illustrating interaction between the global cell and data storage cells is shown. Global server 100, which may contain global load components, global filter components, and other components configured to determine actions based on received data storage information, may communicate with a database 420 and a user interface 410. Database 420 may store storage policies, schedule policies, received sample data, other storage operation information, and so on. User interface 410 may display system information to a user. Further details with respect to the user interface display are discussed below.

Global server 100 may push data to a management server 442. Server 442 communicates with a database 445 and clients 451, 452 and/or 453. Data storage servers 430 push data to the global server 100, and contain data agents 432 and can communicate with databases 435. These servers may communicate with clients 454, 455, and/or 456.

Global server 100 can be configured to perform actions (such as redistributing storage operations), and apply these actions to the data storage system via a management server. Global server 100 receives information used to determine the actions from the storage servers 430. In this example, the global server acts as a hub in the data storage system by sending information to modify data storage operations and monitoring the data storage operations to determine how to improve the operations.

Index Searching

The hierarchical storage system described herein can be used for searching multiple indices of content, retrieving the identified data in accordance with integrated data security policies, and applying the search criteria as a data management policy. Some or all of these functions can be performed via a simple interface accessed, e.g., from a web browser.

The content indices searched can be created by a content indexing system. Indices of this data can be created using any known technique including those described in the assignee's co-pending application Ser. No. 11/694,869 filed Mar. 30, 2007, entitled "Method and System for Offline Indexing of Content and Classifying Stored Data", the contents of which are herein incorporated by reference.

The content indexing system can create an index of an organization's content by examining files generated from routine secondary copy operations performed by the organization. The content indexing system can index content from current secondary copies of the system as well as older copies that contain data that may no longer be available on the organization's network. For example, the organization may have secondary copies dating back several years that contain older data that is no longer available, but may still be relevant to the organization. The content indexing system may associate additional properties with data that are not part of traditional indexing of content, such as the time the content was last available or user attributes associated with the content. For example, user attributes such as a project name with which a data file is associated may be stored.

Members of the organization can search the created index to locate content on a secondary storage device that is no longer online. For example, a user can search for content related to a project that was cancelled a year ago. In this way, content indexing is not affected by the availability of the system that is the original source of the content and users can find additional organization data that is not available in traditional content indexing systems.

In some embodiments, members of the organization can search for content within the organization independent of the content's source through a single, unified user interface, which may be available thorough a web browser. For example, members may search for content that originated on a variety of computer systems within the organization. Members may also search through any copy of the content including any primary, secondary, and/or tertiary or auxiliary copies of the content.

In some embodiments, the content indexing system searches for content based on availability information related to the content. For example, a user may search for content available during a specified time period, such as email received during a particular month. A user may also search specifically for content that is no longer available, such as searching for files deleted from the user's primary computer system. The user may perform a search based on the attributes described above, such as a search based on the time an item was deleted or based on a project with which the item was associated. A user may also search based on keywords associated with user attributes, such as searching for files that only an executive of the organization would have access to, or searching for files tagged as confidential.

Figure 5:
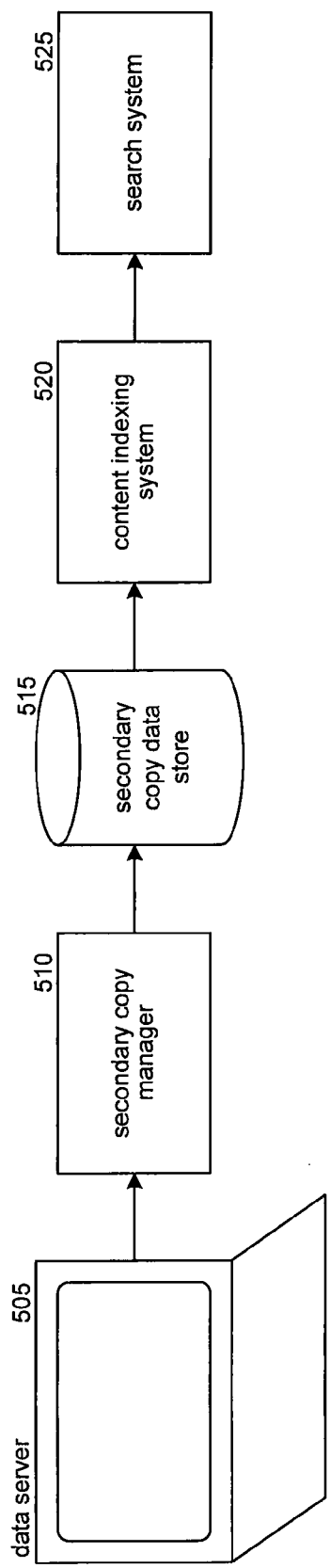
FIG. 5 is a block diagram that illustrates flow of data through the system.

FIG. 5 is a block diagram that illustrates the procedural flow of data, in one embodiment. Content is initially stored on a data server 505 that may be a user computer, data warehouse server, or other information store accessible via a network. The data is accessed by a secondary copy manager 510 to perform a regular copy of the data. Secondary copies of data are stored in a secondary copy data store 515 such as a network attached storage device or secondary copy server. The secondary copy data store 515 provides the data to the content indexing system 520 to perform the functions described above. As illustrated in the diagram, because the content indexing system 520 works with a copy of the data, the original data server 505 is not negatively impacted by the operations of the content indexing system 520. Search system 525 can operate on the data in the content indexing system 520 to provide search functionality for the data having been stored in the secondary copy data store 515.

Figure 6:
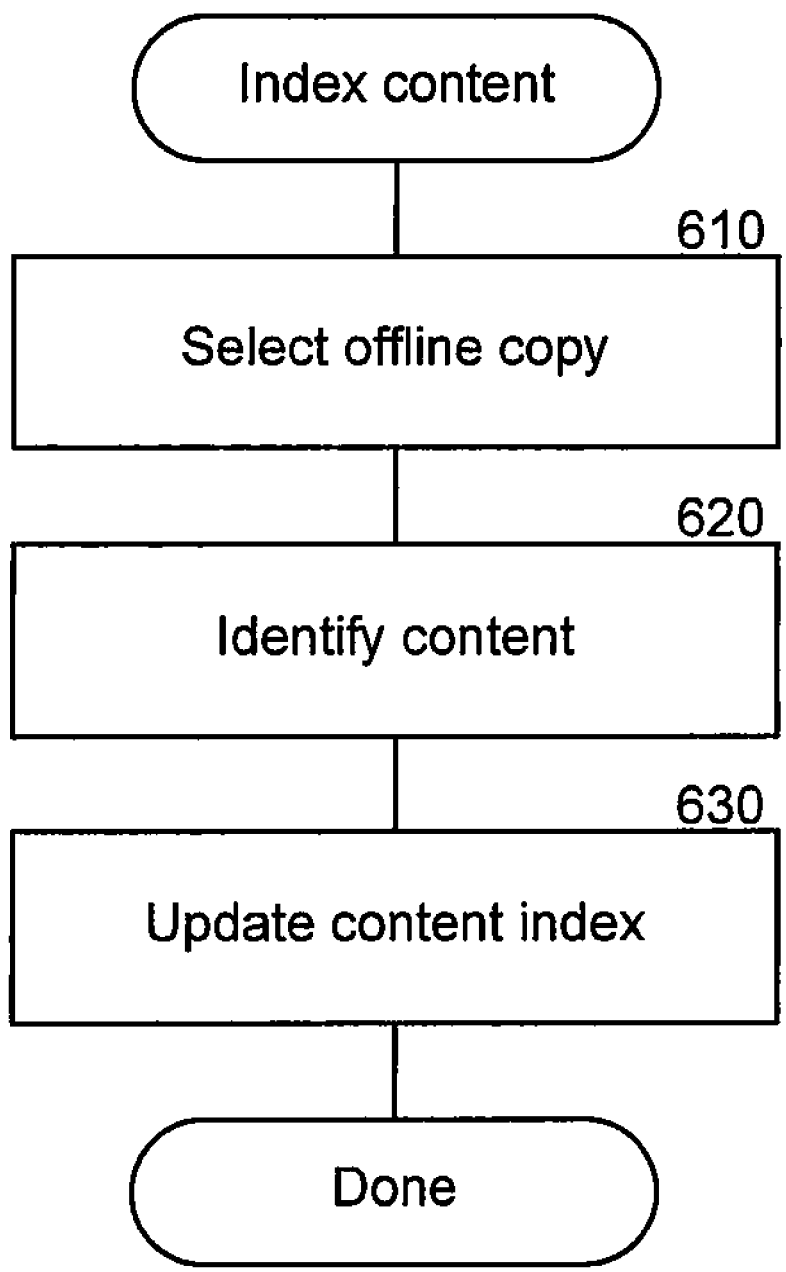
FIG. 6 is a flow diagram that illustrates processing of a content indexing component of the system.
Figure 7:
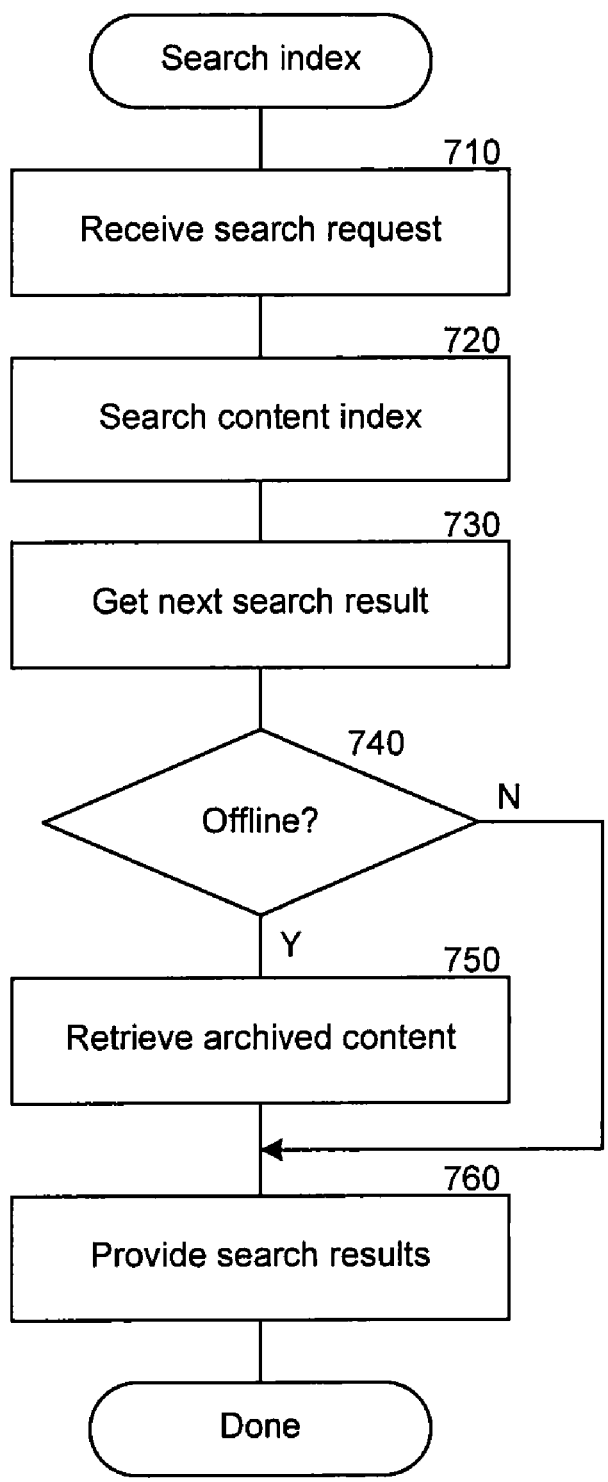
FIG. 7 is a flow diagram that illustrates processing of an index searching component of the system.

FIGS. 6-7 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

FIG. 6 is a flow diagram that illustrates the processing of a content indexing component for later searching, according to one embodiment. The component is invoked when new content is available or additional content is ready to be added to the content index. In step 610, the component selects a copy of the data to be indexed. For example, the copy may be a secondary copy of the data or a data snapshot. In step 620, the component identifies content within the copy of the data. For example, the component may identify data files such as word processing documents, spreadsheets, and presentation slides within the secondary data store. In step 630, the component updates an index of content to make the content available for searching. For example, the component may add information such as the location of the content, keywords found within the content, and other supplemental information about the content that may be helpful for locating the content during a search. After step 630, these steps conclude.

FIG. 7 is a flow diagram that illustrates the processing of an index searching component of the system, in one embodiment. In step 710, the component receives a search request specifying criteria for finding matching target content. For example, the search request may specify one or more keywords that will be found in matching documents. The search request may also specify boolean operators, regular expressions, and other common search parameters to identify relationships and precedence between terms within the search query. The search request may also specify data stores to be searched. The request may specify that the search is to include one or more of an original copy, a primary secondary copy, and secondary or auxiliary copies of the content. As described in more detail below, in some embodiments, a user may be provided with an interface by which to select one or more classes of data stores for search. In some embodiments, an interface may be provided by which a user can specify a security clearance and corresponding operators. For example, a user could form a search query for all documents on a certain class of data store having medium security or higher clearance.

In step 720, the component searches the content index to identify matching content items that are added to a set of search results. For example, the component may identify documents containing specified keywords or other criteria and add these to a list of search results. In step 730, the component selects a first or next search result. In decision step 740, if the search results indicate that the identified content is offline, then the component continues at step 750, else the component continues at step 760. For example, the content may be offline because it is on a tape that has been sent to an offsite storage location. In step 470, the component retrieves the archived content. Additionally or alternatively, the component may provide an estimate of the time required to retrieve the archived content and add this information to the selected search result. In step 760 the component provides the search results in response to the search query. For example, the user may receive the search results through a web browser interface that lists the search results or the search results may be provided to another component for additional processing through an application programming interface (API). After step 760, these steps conclude.

Federated Search

The search described herein can include indices of data, where the data is a snapshot, primary copy, secondary copy, auxiliary copy, and so on. An organization may have several copies of data available on different types of media. Data may be available on, for example, a tape, on a secondary copy server, or through network attached storage.

The search capability can be extended to handle an end-user based search via a web interface, a user-based search (e.g., all files that can belong to "Bob" or that can be viewed by "Bob"), search results across several application types (e.g., file copies, Microsoft Exchange mailbox copies, Microsoft Exchange data agents, Microsoft Exchange public folders, etc.) and search results across multiple computers.

Figure 8:
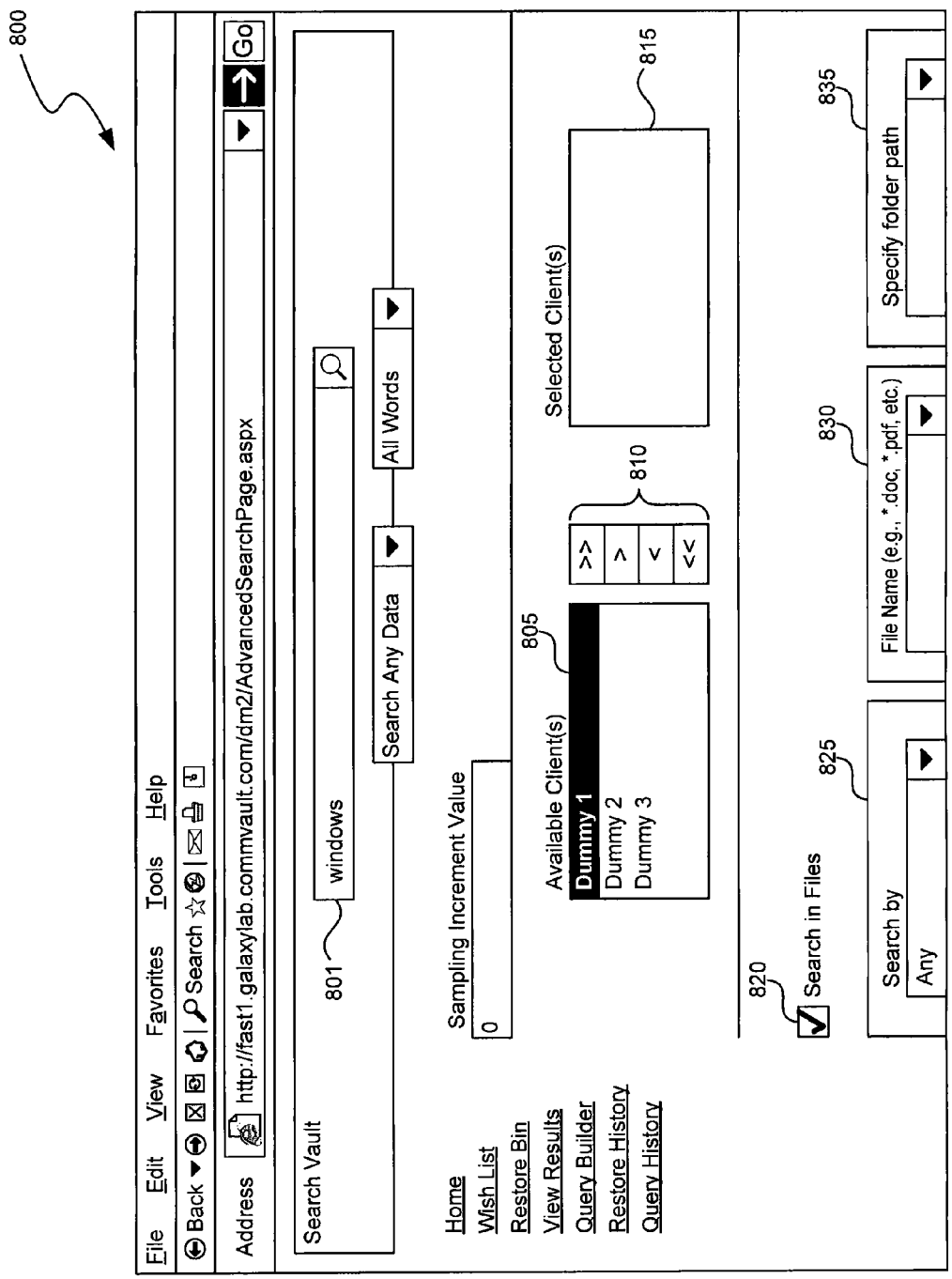
FIG. 8 illustrates a client selection interface for searching.

Using a graphical user interface, search criteria can be provided to specify data that is stored on any number and type of volumes and any type of data. An interface such as the interface 800 illustrated in FIG. 8 can be used to specify a search term 801 and one or more clients or volumes to search. As illustrated in FIG. 8, a list of available clients 805 can be presented. A set of controls 810 can be used to select one or more of the available clients. Selected clients can be displayed in region 815. Variations on this embodiment of the interface can be used to allow a user to select various volumes for the search. For example, the interface can allow a user to specify that the search is to be over the original copy, a primary secondary copy, and secondary or auxiliary copies of the content. The interface can also be configured to allow the user to specify that the search is to include file contents. An exemplary interface for allowing this option and receiving additional related parameters from a user can include an enabling check box 820 for searching in files, a search by field 825, a file name field 830, and a folder path 835 field.

Figure 9:
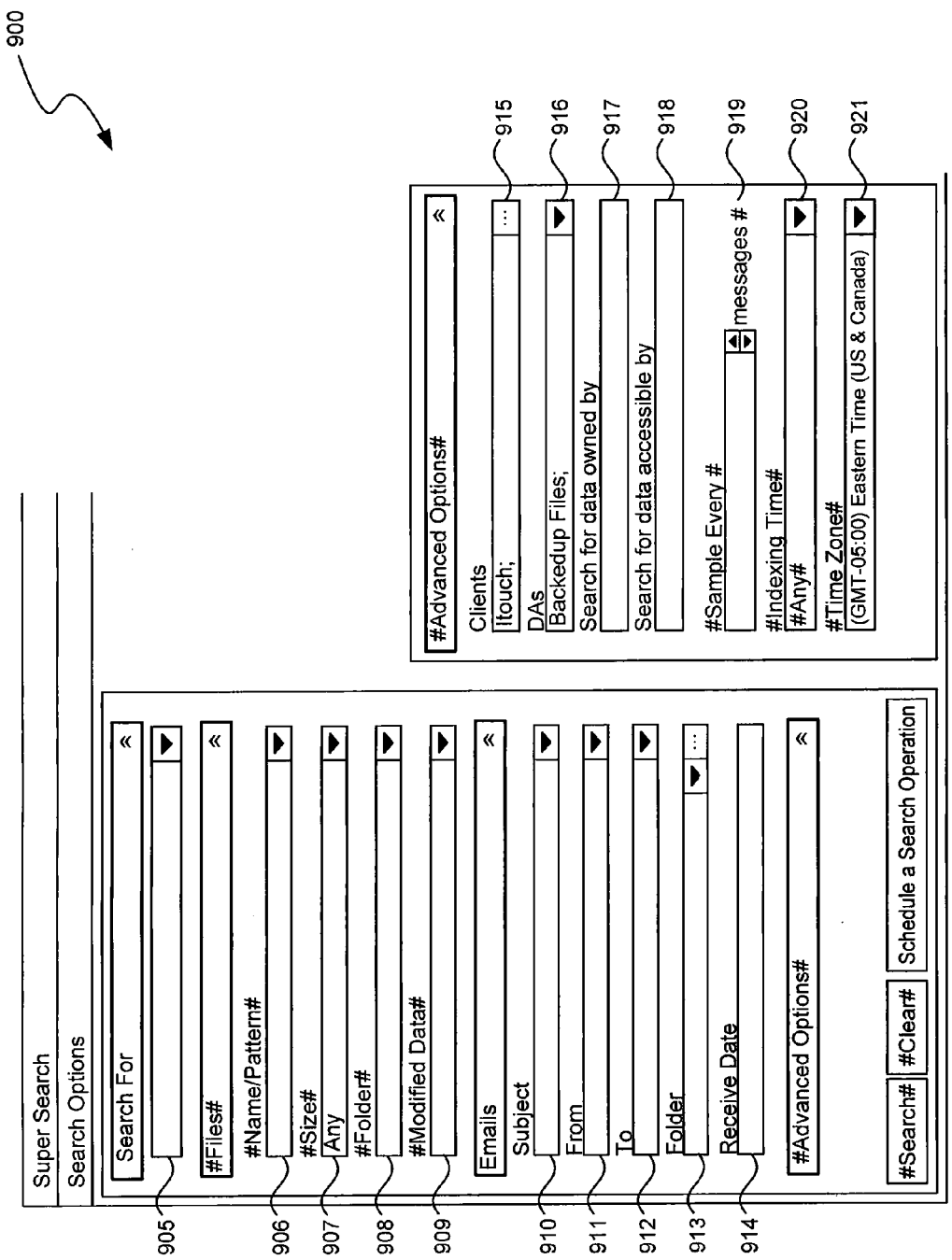
FIG. 9 illustrates a query construction interface for searching.

The search criteria can also specify that the data be from any of multiple applications or of any type. An example of an interface for receiving additional search parameters is shown in FIG. 9. The search interface 900 can include fields for a search term 905, file name 906, file size 907, folder 908, modification date 909, email subject 910, email sender 911, email recipient 912, folder 913, date of receipt 914, and various advanced options such as client 915, iDA 916, owner 917, accessibility 918, sample 919, indexing time 920, and time zone 921.

Through the same interface or a separate interface, the user can also select the various types of application data to be searched. The graphical interface for performing the search can provide an efficient means for a user to enter search terms and perform that search over multiple volumes and data types. For example, the interface can provide check boxes or other population routines for identifying hardware or resources and display the list whereby a user can select specific volumes by name or address or whereby a user can select volumes by type or classification. Similarly, a user may be prompted to specify data types or classes.

In some embodiments, the search performed over multiple secondary copies and physical devices will be made with reference to metadata stored in one or more metabases or other forms of databases. A data collection agent may traverse a network file system and obtain certain characteristics and other attributes of data in the system. In some embodiments, such a database may be a collection of metadata and/or other information regarding the network data and may be referred to herein as a metabase. Generally, metadata refers to data or information about data, and may include, for example, data relating to storage operations or storage management, such as data locations, storage management components associated with data, storage devices used in performing storage operations, index data, data application type, or other data. Operations can be performed on this data using any known technique including those described in the assignee's co-pending application Ser. No. 11/564,119 filed Nov. 28, 2006, now U.S. Pat. No. 7,668,884, entitled "Systems and Methods for Classifying and Transferring Information in a Storage Network" the contents of which are herein incorporated by reference.

With this arrangement, when a search over multiple secondary copies is to be performed, a system administrator or system process may simply consult the metabase for such information rather than iteratively access and analyze each data item in the network. This approach significantly reduces the amount of time required to obtain data object information by substantially reducing or eliminating the need to obtain information from the source data, and furthermore reduces or minimizes the involvement of network resources in this process, thereby reducing the processing burden on the host system.

In some embodiments, a query may be received by the system for certain information. This request may be processed and analyzed by a manager module or other system process that determines or otherwise identifies which metabase or metabases within the system likely include at least some of the requested information. For example, the query itself may suggest which metabases to search and/or the management module may consult an index that contains information regarding metabase content within the system. The identification process may include searching and identifying multiple computing devices within an enterprise or network that may contain information satisfying search criteria.

A processor can be configured to search metabases or other indices corresponding to multiple volumes and data stores to identify an appropriate data set that may potentially have information related to the query. This may involve performing iterative searches that examine results generated by previous searches and subsequently searching additional, previously unidentified metabases to find responsive information that may not have been found during the initial search. Thus, the initial metabase search may serve as a starting point for searching tasks that may be expanded based on returned or collected results. The returned results may be optionally analyzed for relevance, arranged, and placed in a format suitable for subsequent use (e.g., with another application), or suitable for viewing by a user and reported.

Figure 10:
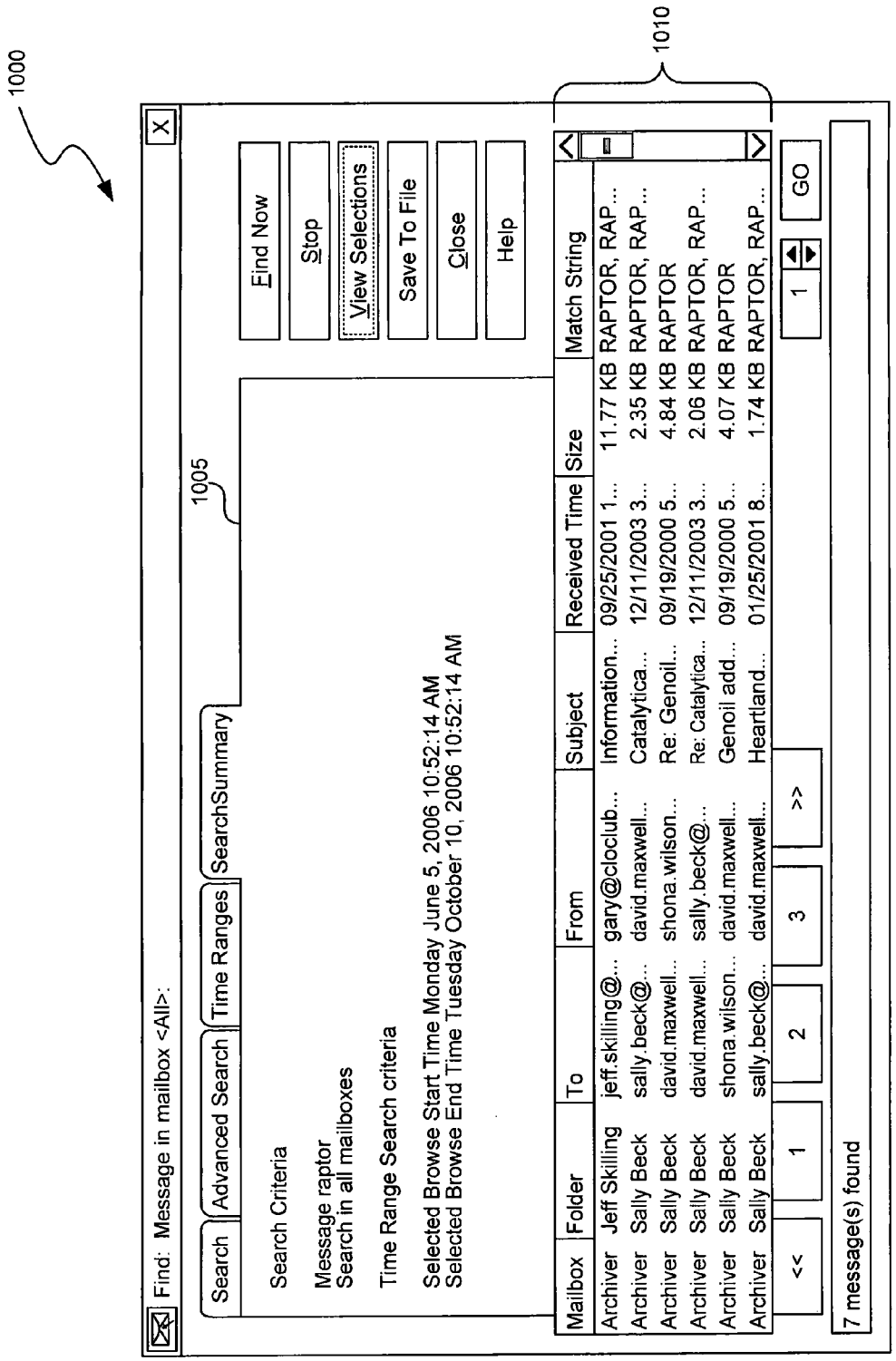
FIG. 10 illustrates a search summary.

Once a search has been performed and at least one document or other discrete data item identified, a list of the identified documents or data items can be provided. An example interface 1000 for displaying the results of an email search is illustrated in FIG. 10. The interface 1000 can include a summary area 1005 with summary information as well as a search results section 1010.

In some further embodiments, the one or more identified documents can be retrieved without performing a restore of the data back to the production volume. Such a transfer may involve copying data objects and metadata from one data store and metabase to another, or in some embodiments, may involve migrating the data from its original location to a second location and leaving a pointer or other reference to the second location so the moved information may be quickly located from information present at the original location.

Figure 11:
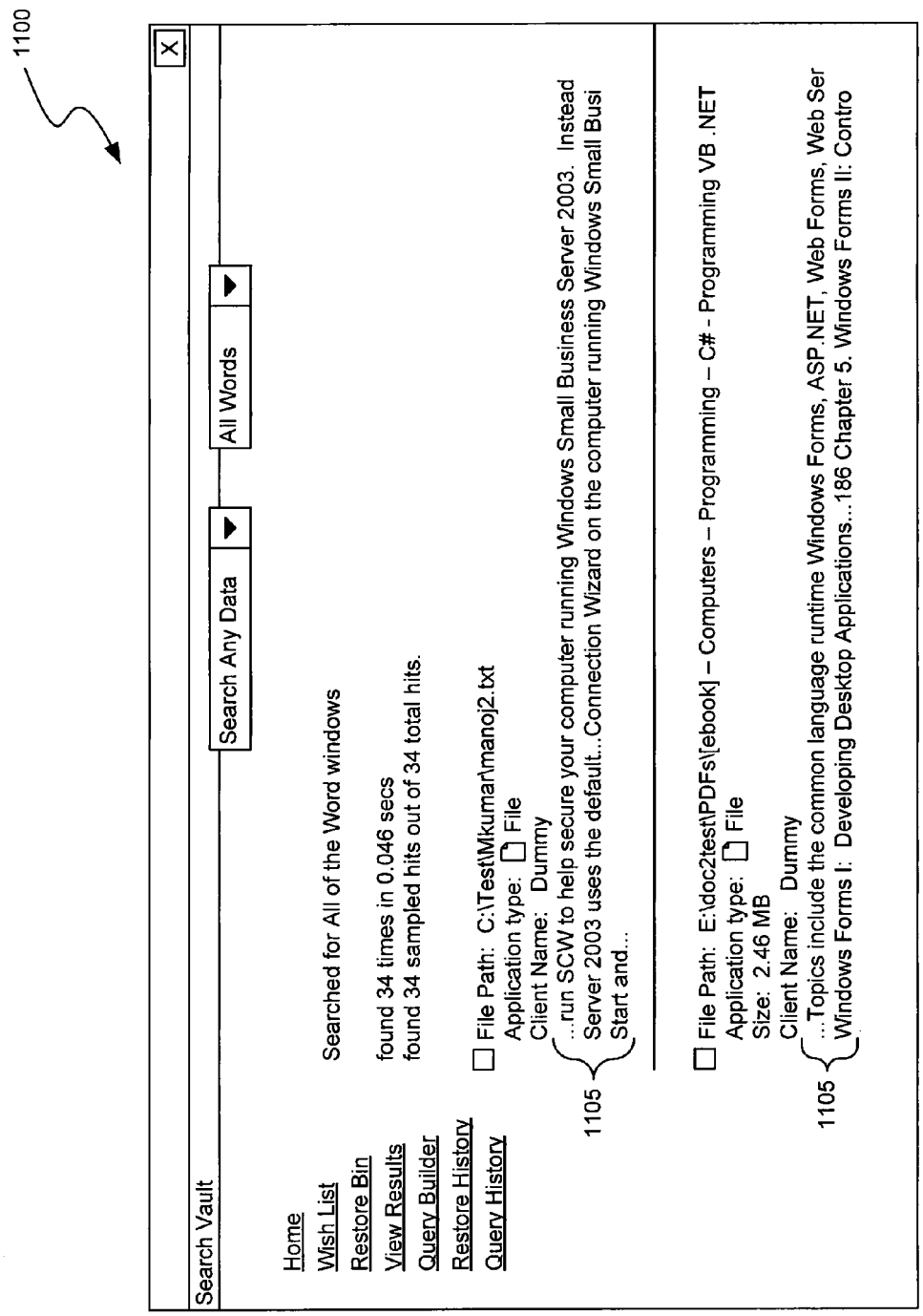
FIG. 11 illustrates a results display in an interface for searching.

In some embodiments, a preview pane can be provided so that a user can view at least a portion of the contents of the identified file. One such preview pane 1100 is illustrated in FIG. 11. This preview can be provided before any restore or retrieve operation is executed. In some embodiments, the preview can be generated by reading the identified file from the original data store and displaying the contents on the screen. In other embodiments, the identified file can be copied to a local disk and the preview generated based on file as it resides on a local disk. In some embodiments, the interface can display a portion of content 1105 from the data file returned by the search query and, in some further embodiments, prompt a user to refine the search. Data retrieval can also be performed using any known technique including those described in the assignee's co-pending application Ser. No. 11/694,890 filed Mar. 30, 2007, now U.S. Pat. No. 7,734,669, entitled "System and Method for Data Retrieval, Including Secondary Copy Precedence Optimizations", the contents of which are herein incorporated by reference.

Data Management Policy Integration

In some embodiments, the search criteria provided by a user as part of a search can later be applied as a data management policy. For example, a user could develop search terms that identify a certain set of data files. These search terms can then be stored as a data management policy which can then be applied at any other point in the data storage system. A data management policy created in this manner can be a data structure or other information source that includes a set of preferences and other storage criteria associated with performing a storage operation. The data management policy created based on a user-supplied search criteria can also be used as part of a schedule policy.

A schedule policy may specify when to perform storage operations and how often, and may also specify performing certain storage operations on sub-clients of data and how to treat those sub-clients. A sub-client may represent static or dynamic associations of portions of data of a volume and are typically mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. The search criteria provided by a user can be used as a file selector in connection with any schedule policy.

In some embodiments, the data management policy can include various storage preferences, for example, those expressed by a user preference or storage policy. As non-limiting examples, the data management policy can specify a storage location, relationships between system components, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period of time before being aged to another tier of secondary storage, copied to secondary storage using a specified number of streams, etc. A storage policy and/or a schedule policy may be stored in a storage manager database or in other locations or components of the system.

Integrated Data Rights Security Control

Some organizations may have multiple levels of security according to which some users can access certain files while others cannot. For example, a high security user group can be defined and this group can be granted access to all documents created by the organization; a medium security group can be granted access to only certain classes of documents; a low security group can be granted access only to certain pre-defined documents.

The search interface described herein can be configured to be accessible by any type of user including a secondary copy administrator, an end user who does not have any administrative privileges, or a user of any security clearance. Additionally, the data files stored in the data management system can tagged with security information. This information tag can be stored in a metabase or any other form of content index and can be used to leverage existing security schema. In embodiments in which a search is performed on one or more context indices, corresponding security tag information can be stored therein. Security information can include identification of various classes of users who are granted rights to access the document as well as identification of classes of users who are denied access rights.

In some embodiments, security information can be stored in the form of user tags. User tags are further described in the assignee's co-pending application Ser. No. 11/694,784 filed Mar. 30, 2007, entitled "System and Method Regarding Security And Permissions", the contents of which are herein incorporated by reference.

In some further embodiments, the search results can be filtered based on the user's security clearance or access privileges. After a user enters search parameters, data files matching those parameters may be identified, and a list of the identified files displayed to the user. If the user does not have the required security clearance or access privileges, the interface can be configured not to display the file.

It is possible that a secondary copy administrator may not have sufficient security clearance to inspect a file that is being restored or retrieved. In such a circumstance, the administrator will not be allowed to preview the file or otherwise inspect the contents of it during the search process. The interface providing results may be configured to not display a preview of such a file. If a secondary copy administrator had sufficient security clearance, then a preview may be provided or the administrator may be allowed to make a local copy of the file.

If the secondary copy administrator does not have sufficient security clearance for a specific file or group or class of files, an interface may be provided through which the administrator may initiate a copy of that file directly from the secondary copy device to a directory or disk associated with a user who has sufficient security clearance. In some instances, the user associated with the file may be the owner of the file. If the secondary copy administrator or other user executing a search query has sufficient security clearance to inspect the contents of the one or more files identified in the search, a preview of the data file may be displayed.

System Embodiments

The following discussion provides a brief, general description of a suitable computing environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, minicomputers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

Conclusion

From the foregoing, it will be appreciated that specific embodiments of the system have been described herein for purposes of illustration, but that various modifications may be made without deviating from the spirit and scope of the invention. For example, although files have been described, other types of content such as user settings, application data, emails, and other data objects can all be indexed by the system. Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A non-transitory computer-readable medium storing instruction that, when executed by a computer, perform a method for managing data associated with a data storage device, wherein the data storage device is coupled to multiple computers over a network, the method comprising:
   storing, in an index, information that describes application data stored in the data storage device,
      wherein the information includes keywords that are present in the application data and
      wherein the information includes the location of the application data;
   determining that the application data from the data storage device has been moved to an offsite location,
      wherein the application data is not available over the network when at the offsite location;
   updating the information in the index to reflect movement of the application data from the data storage device to the offsite location,
      wherein the updated information indicates the offsite location of the migrated application data;
   receiving a query from a user, wherein the query includes at least one search parameter;
   searching the index for application data that matches the at least one received search parameter,
      wherein the searching accesses the information in order to identify matching application data at the offsite location; and,
   returning to the user data regarding the identified matching application data at the offsite location.

2. The non-transitory computer-readable medium of claim 1, further comprising storing application data received from multiple computers over the network in the data storage device, the application data comprising data in multiple formats, wherein each format corresponds to a different software format.

3. The non-transitory computer-readable medium of claim 1, further comprising storing the at least one received search parameter as a new data storage policy, wherein the new data storage policy comprises a set of preferences or storage criteria associated with performing future storage operations.

4. The non-transitory computer-readable medium of claim 3, wherein the new data storage policy is associated with a scheduling component and defines when the scheduling component should perform a storage operation and how often to perform the storage operation.

5. The non-transitory computer-readable medium of claim 3, wherein the new data storage policy is stored in a storage manager, the storage manager further comprising a jobs agent configured to carry out data storage operations, a management agent configured to monitor the status of the data storage operations, and an interface module configured to display the status of the data storage operations to a user.

6. The method of claim 1, further comprising receiving the query from the user across the network via a web browser, wherein the searching identifies data stored across multiple data storage tiers in the network matching the at least one search parameter.

7. The non-transitory computer-readable medium of claim 1, further comprising identifying one or more documents that match the at least one search parameter and retrieving one or more identified documents for access by a user without overwriting a current copy of the one or more identified documents on the data storage component.

8. The method of claim 1, further comprising:
creating a data storage policy that specifies one or more data storage operations to be performed on the stored application data,
wherein the data storage policy is created in part based on results obtained from the searching of the index,
wherein the searching accesses the information and identifies matching application data from multiple computers and in multiple formats, and
wherein the data storage policy is a data structure that includes a set of criteria used to perform storage operations; and,
performing the one or more data storage operations on the stored application data based on the data storage policy and based on the results obtained from the searching of the index.

9. A non-transitory computer-readable medium storing instruction that, when executed by a computer, perform a method for accessing files, the method comprising:
receiving from a user a request to access one or more files, wherein the request is associated with a user's security level;
searching a database to locate metadata describing one or more files satisfying the request based on a security level stored with the metadata that describes files,
providing a signal to access, via a network and in response to the request, the one or more files at the identified data storage devices;
determining that at least one of the files has been moved to an offsite location,
wherein the at least one migrated file is not available over a network when at the offsite location;
updating the database to reflect the movement of the at least one file to the offsite location;
receiving a query having one or more search parameters relating to files stored on at least one of the data storage devices and relating to the at least one file at the offsite location;
searching the database to locate metadata describing the at least one file at the offsite location that satisfies the search parameters; and,
retrieving the at least one file that satisfies the search parameters from the offsite location.

10. The non-transitory computer-readable medium of claim 9, further comprising determining access control information of one or more files determined to satisfy the received search parameters and comparing the access control information to a security level of a user associated with the query.

11. The non-transitory computer-readable medium of claim 9, wherein the database is a metabase, and wherein the metabase is generated at least in part by examining files that were generated from secondary copy operations, and wherein the metadata includes locations of the one or more files.

12. The non-transitory computer-readable medium of claim 9, further comprising
resolving references in the located metadata to identify data storage devices containing the files,
wherein the resolving at least assists in determining which data storage devices to access the files from, and
wherein the access is at least in part based on a data access criteria that specifies the results that the user has access to view.

13. The non-transitory computer-readable medium of claim 12, further comprising displaying a preview of each file determined to satisfy the received search parameters and for which the security level is sufficient for viewing the files based on the access control information.

14. A non-transitory computer-readable medium storing instruction that, when executed by a computer, perform a method for managing data associated with one or more data storage devices, wherein the data storage devices are coupled to multiple computers over a network, the method comprising:
receiving a user's first data object from a first computer over the network;
indexing content of the first data object;
performing a first storage operation on the first data object, wherein
performing the first storage operation results in—
creating a second data object, wherein the second data object is a secondary copy of the first data object, and
indexing content of the second data object;
performing a second storage operation on the second data object, wherein the performance of the second storage operation results in—
creating a third data object, wherein the third data object is a modified secondary copy of the first data object, and
indexing content of the third data object;
sending the third data object to an offline storage location,
wherein the offline storage location is not accessible to the computers over the network;
maintaining a content index of data associated with the data storage devices, wherein the data associated with the data storage devices includes—
secondary copies of data objects, and
offline copies of data objects, and
wherein the content index reflects the indexed content of at least the first, second, and third data objects;
in response to receiving a user's query, searching the content index to identify the third data object that is stored in the offline storage location and that matches search criteria provided by the user; and,
providing information to the user regarding the identified third data object that is stored in the offline storage location.

15. The non-transitory computer-readable medium of claim 14, further comprising receiving user input through a graphical user interface identifying a type of data to be used for searching.

16. The non-transitory computer-readable medium of claim 14, wherein the index comprises multiple content indices, and wherein each of the content indices is associated with a logical volume that represents one or more physical volumes.

17. The non-transitory computer-readable medium of claim 14, further comprising storing multiple security policies relating to multiple users, wherein the policies further define data access rights for those users that specify the data that can be accessed by each user.

18. The non-transitory computer-readable medium of claim 14, further comprising receiving search criteria from a user and an indication that the search criteria produce the type of results that a user wants to find on a regular basis, and storing the search criteria as a data management policy that the user can apply to future storage operations.

19. The non-transitory computer-readable medium of claim 14, wherein the secondary copies comprise copies of secondary copies on which additional data storage operations have been performed.

20. The non-transitory computer-readable medium of claim 14, wherein two or more of the secondary copies differ in type of document and time of creation.

21. The non-transitory computer-readable medium of claim 14, wherein the third data object is a modified secondary copy of the first data object that has been modified by compression or encryption.

* * * * *

UNITED STATES PATENT AND TRADEMARK OFFICE
CERTIFICATE OF CORRECTION

PATENT NO.        : 8,234,249 B2                              Page 1 of 1
APPLICATION NO.   : 13/076634
DATED             : July 31, 2012
INVENTOR(S)       : Anand Prahlad et al.

It is certified that error appears in the above-identified patent and that said Letters Patent is hereby corrected as shown below:

On Title page 2, in column 2, Item (56) under "U.S. Patent Documents", line 20, delete "Smith et al." and insert -- Bolik et al. --, therefor.

In column 4, line 58, delete "thorough" and insert -- through --, therefor.

Signed and Sealed this
Twenty-seventh Day of November, 2012

David J. Kappos
*Director of the United States Patent and Trademark Office*